United States Patent [19]

Hart et al.

[11] 4,237,817

[45] Dec. 9, 1980

[54] APPARATUS FOR SPRAYING POWDER CIRCUMFERENTIALLY AROUND A PIPE JOINT

[75] Inventors: Robert J. Hart; Russell M. Langley, both of Tulsa, Okla.

[73] Assignee: Commercial Resins Company, Tulsa, Okla.

[21] Appl. No.: 23,095

[22] Filed: Mar. 23, 1979

[51] Int. Cl.³ .......................... B05B 1/06; B05B 15/04
[52] U.S. Cl. ..................................... 118/307; 118/309; 118/310; 118/311; 118/312; 118/DIG. 12; 427/195; 427/245
[58] Field of Search ................ 427/195, 245; 118/307, 118/DIG. 11, 312, 309, 310, 305, 311

[56] References Cited

U.S. PATENT DOCUMENTS

| | | | |
|---|---|---|---|
| 3,208,868 | 9/1965 | Strobel et al. | 118/312 X |
| 3,854,634 | 12/1974 | Hart | 33/126.7 A X |
| 3,901,184 | 8/1975 | Payne et al. | 118/312 X |
| 4,005,677 | 2/1977 | Hart | 118/DIG. 11 X |
| 4,038,942 | 8/1977 | Hart | 118/305 |
| 4,111,154 | 9/1978 | Kissel et al. | 118/312 X |

FOREIGN PATENT DOCUMENTS 4,540,437  12/1970  Japan .................................. 427/195

*Primary Examiner*—Shrive P. Beck
*Attorney, Agent, or Firm*—William S. Dorman

[57] ABSTRACT

Apparatus for spraying a powder circumferentially around a pipe joint on a pipe comprising a yoke engagable with the pipe, one or more powder dispensers mounted on the yoke and disposed over the pipe joint, means for driving the yoke circumferentially about the pipe, each powder dispenser having an inner housing provided with an opening positioned adjacent the surface of the pipe for supplying a quantity of air-powder suspension to the surface of the pipe over the pipe joint, each powder dispensing device also having an outer housing surrounding the inner housing and being provided with an opening positioned adjacent the pipe and surrounding the opening of the inner housing, the inner and outer housings of each powder dispenser defining a space therebetween. A powder suspension device is provided having a hollow container adapted to contain a quantity of powder therein and a means for introducing air under pressure adjacent the bottom of the container to place the powder in suspension in the container. A blower is also provided having an inlet and a tangential outlet from which a stream of air emerges. A powder return housing is located beneath the blower and above the powder suspension device and in communication with both of these devices. A pair of tangential inlet pipes arranged approximately 180° apart on the return housing are adapted to return excess powder from the powder dispensing devices.

7 Claims, 7 Drawing Figures

APPARATUS FOR SPRAYING POWDER CIRCUMFERENTIALLY AROUND A PIPE JOINT

BACKGROUND OF THE INVENTION

1. Field of the Invention

This invention relates to improvements in apparatus for spraying a powder circumferentially around a pipe joint in a pipe or the like. More particularly, this invention relates to an improvement in the method and means for supplying the air-powder suspension to the weld joint and for returning excess powder to the system.

2. Description of the Prior Art

U.S. Pat. No. 4,038,942 entitled "System for Spraying a Powder Circumferentially Around a Pipe", and owned by the assignee of the present invention, describes a yoke, a powder dispensing device mounted on the yoke, a powder suspension system, a means for delivering powder from the powder suspension system to the powder dispenser and also means for returning excess powder from the powder dispenser back into the system. The powder suspension device shown in U.S. Pat. No. 4,038,942, referred to above, is similar to that described in U.S. Pat. No. 3,854,634 entitled "Powder Dispenser". The yoke employed in U.S. Pat. No. 4,038,942, referred to above, is similar to that disclosed in U.S. Pat. No. 4,005,677 entitled "Apparatus for Circumnavigating a Dispenser About a Pipe or the Like".

The pipe or pipeline to which the prior art and the present invention both relate, is generally made up from pipe sections which have been previously coated at the mill except for the ends thereof which are left uncoated so that the sections can be welded together in the field in end-to-end relation. The apparatus in U.S. Pat. No. 4,005,677, therefore, deposits powder on the weld joints (which have been previously heated) to complete the coating of the pipe. However, it is difficult to meter exactly the quantity of powder to be supplied to each weld joint. Obviously, an insufficient quantity of powder will result in a poor or inadequate coating of the weld joint. In practice, a quantity of powder slightly in excess of that required is supplied to the weld joint. This excess powder can result in the contamination of the air in the area of the pipe joint, and it can also result in a loss of powder from the system. U.S. Pat. No. 4,038,942 provides a system whereby the excess powder in the area of the weld joint is sucked up and returned to the system.

SUMMARY OF THE INVENTION

In light of the above, it is an object of the present invention to provide an apparatus for spraying powder circumferentially around a pipe joint wherein means are provided for sucking up the excess powder adjacent the weld joint and for returning the excess powder to the system. It is a further object of the present invention to provide an improved means for delivering an air-powder suspension to the powder dispensing device and for returning excess powder from the weld joint back into the system.

Briefly stated, the apparatus of the present invention includes a yoke capable of surrounding the pipe in the area of the weld joint and over a portion of the pipe representing more than 180° of the circumference of the pipe, and preferably, over the entire circumference of the pipe. The present apparatus includes a pair of powder dispensers mounted on the yoke approximately 180° apart, a powder suspension device, a blower supplying a stream of air, a return housing communicating with the inlet to the blower and also with the interior of the powder suspension device to recycle returned powder back to the powder suspension device and a pair of Venturis having their inlets connected to the powder suspension device, a pair of air streams passing through the Venturi for sucking powder suspension from the powder suspension device and for delivering the powder suspension to the exhaust from the blower whereby the blower delivers an air-powder suspension to the two powder dispensers. The return housing which, is indicated above, constitutes the suction inlet for the blower is provided with a pair of tangential inlet pipes. Each powder dispenser has an inner housing and an outer housing forming a space therebetween and both dispenser housings have openings positioned adjacent the surface of the pipe. The spaces between the housings on the powder dispensers are connected with a pair of conduits which, in turn, are connected to the two tangential inlet pipes on the return housing so as to suck up excess powder from the weld joint. Whereas, the apparatus of U.S. Pat. Nos. 4,005,677 and 4,038,942 each show a single powder dispenser and a single belt-type tractor means for moving the yoke around the circumference of the pipe, the present invention includes two spaced powder dispensers, as indicated above, and in addition, two crawler belt driving mechanisms for moving the yoke circumferentially around the pipe.

DETAILED DESCRIPTION OF THE PREFERRED EMBODIMENTS

Figure 1:
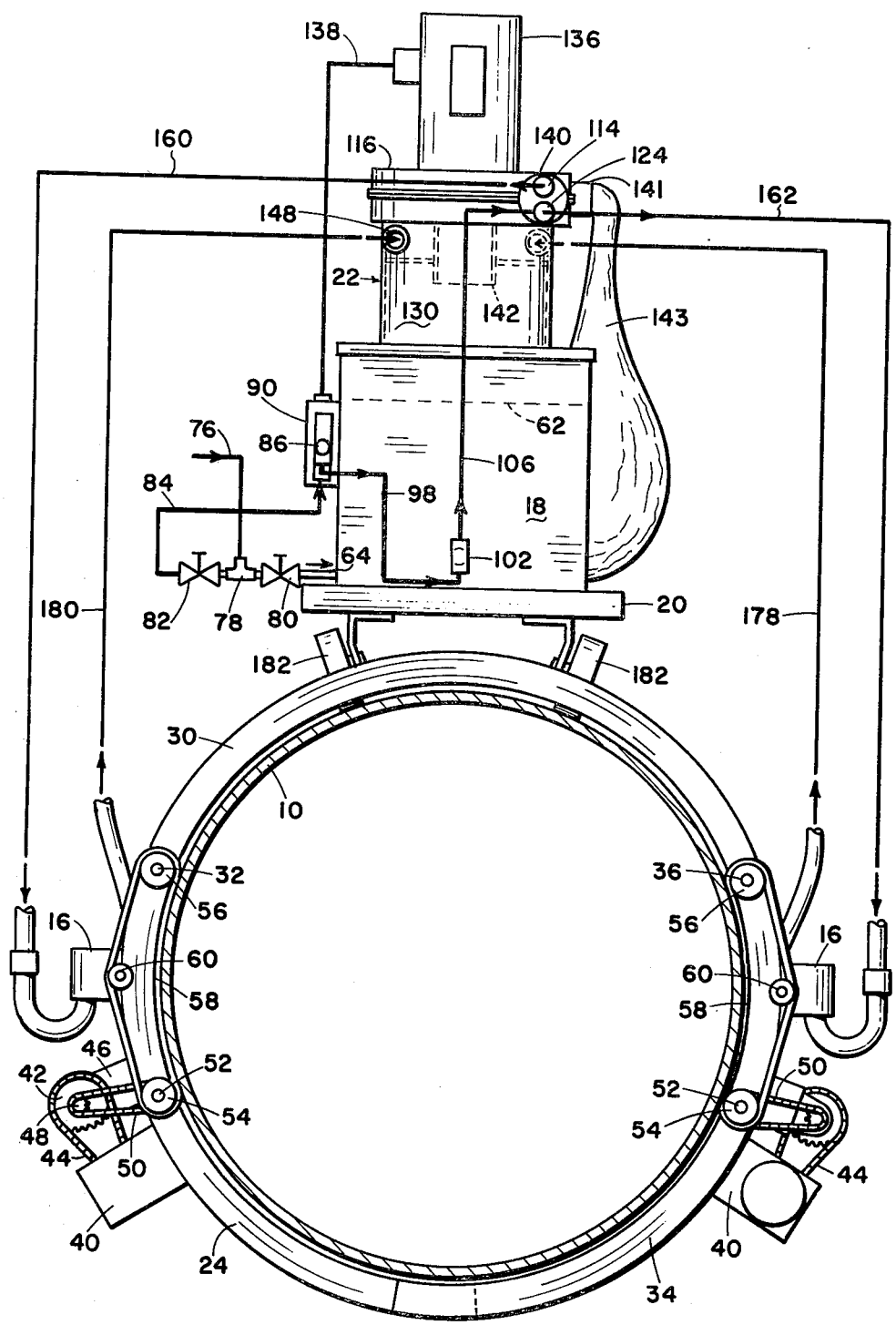
FIG. 1 is an end elevational view, partially diagrammatic, showing the apparatus of the present invention mounted for operation on a pipe, the latter being shown in section.
Figure 2:
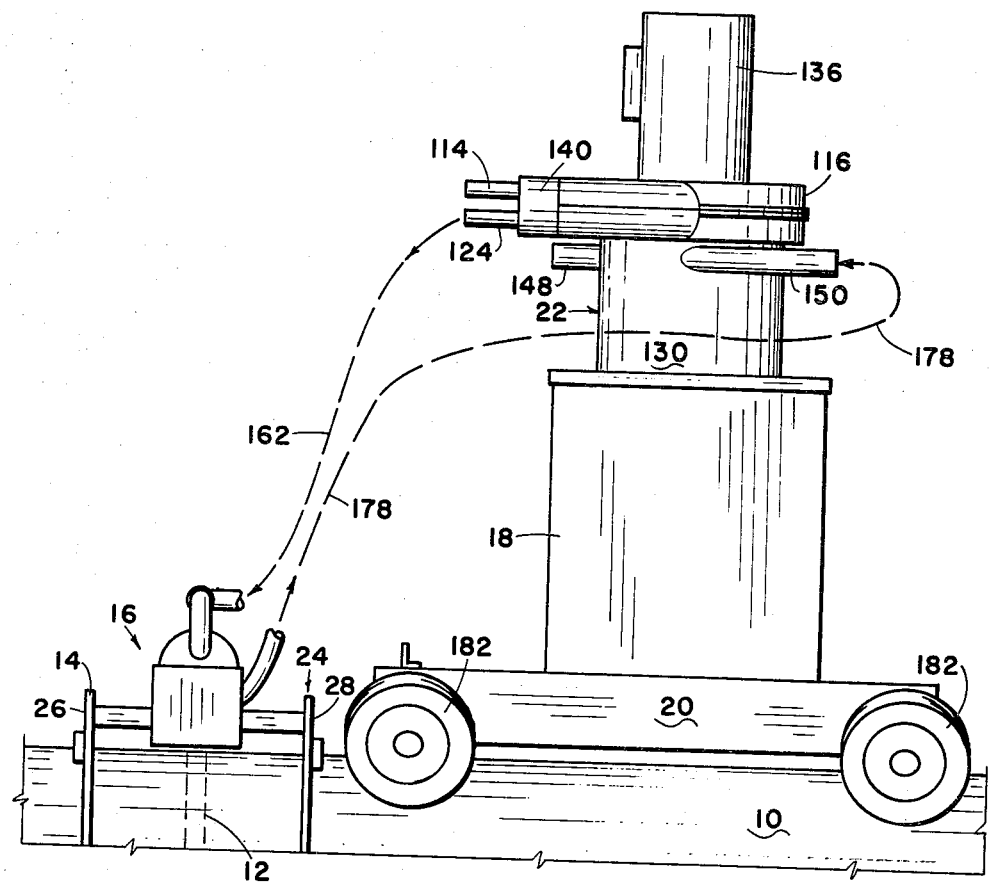
FIG. 2 is a side elevation, partially diagrammatic, of the powder spraying apparatus shown in FIG. 1.

Referring to the drawings in detail, FIGS. 1 and 2 show a pipe 10 which has been made up from pipe sections welded together in end-to-end relation. These pipe sections have been previously coated at the mill except for the ends which, as indicated above, are welded together in the field. The basic purpose of the present invention is to provide an apparatus capable of coating these weld joints, one of which is diagrammatically illustrated at 12 in FIG. 2. Since the apparatus of the present invention is providing a powder to the surface of the weld joint, the latter would have been previously heated by a suitable heating means (not shown) to a sufficient temperature to cause the powder to melt and cure.

The apparatus of the present invention includes a device or yoke 14 (the details of which will appear more fully hereafter) capable of moving circumferentially about the pipe 10. The yoke 14 has mounted thereon a powder dispenser 16 (the details of which will more fully appear hereafter). A powder suspension device 18 (the details of which will appear more fully hereafter) is mounted on a vehicle or dolly 20 which is capable of moving along the pipe. The powder suspension device provides a supply of suspended powder to the powder dispenser 16 in a manner later to be described. A blower system 22 (later to be described) provides a source of air for delivering a powder suspension to the powder dispenser 16 and also constitutes a means for returning excess powder from the area of the weld in a manner later to be described.

Figure 7:
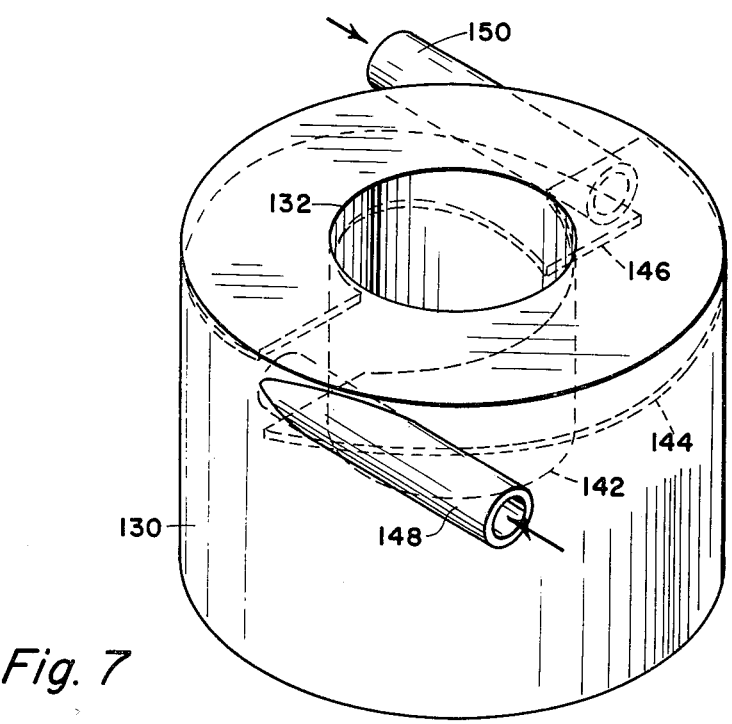
FIG. 7 is a perspective view, with certain hidden portions shown in dotted lines, of the powder return housing shown in FIG. 5.

The yoke 14 for circling the pipe is similar to the apparatus disclosed in U.S. Pat. No. 4,005,677 issued on Feb. 10, 1977, and entitled "Apparatus for Circumnavigating a Dispenser About a Pipe or the Like." The yoke 14 includes a first arcuate frame member 30 (similarly formed by a pair of spaced members) and pivotally connected to the first frame member 24 by means of a rod 32 (which also constitutes an axle for a pair of wheels or pulleys as will be later described). The yoke 14 also includes a third arcuate frame member 34 which is hingedly or pivotally connected to the second arcuate frame member 30 by means of a rod 36 (which also constitutes a means for supporting a pair of wheels or pulleys as will be described hereinafter). The adjacent ends of the arcuate frame members 24 and 34 can be connected together in any convenient manner, for example, in the manner shown in FIG. 7 in U.S. Pat. No. 4,005,677 referred to above.

Arcuate frame member 24 has a motor 40 mounted thereon which drives a sprocket 42 by means of a chain 44 which passes around the sprocket 42 and another sprocket (not shown) on the shaft (not shown) for the motor 40. The sprocket 42 is rotatably supported on a bracket or support member 46 which is secured to the arcuate frame member 24. The sprocket 42 is in driving relation with a smaller sprocket 48, and another chain 50 surrounds the sprocket 48 and another sproket (not shown) mounted on a rod 52 which passes through the sides of the frame member 24. A pair of pulleys 54 (only one of which is shown in FIG. 1) are mounted at the opposite ends of the rod 52, and another pair of pulleys 56 (only one of which is shown in FIG. 1) are mounted at the opposite ends of the rod 32. A pair of belts 58 are disposed around the pairs of pulleys 54 and 56 and also over idler pulleys 60. The belts 58 constitute a means for driving the frame 14 circumferentially around the pipe 10.

The arcuate frame member 34 also includes an essentially identical means for driving the frame member circumferentially around the pipe in conjunction with the means just described; thus, the frame member 34 includes a motor 40, etc. All of the various portions of the driving mechanism mounted on the arcuate frame member 34 are the same as those previously described in connection with the frame member 24 and are similarly numbered except that the pulleys 56 (as they relate to the frame member 34) are mounted on the opposite ends of the rod 36 (the pulleys 56 for the driving mechanism shown at the left in FIG. 1 are mounted on the rod 32).

The powder suspension device 18 is provided with a quantity of powder (not shown) which is generally sufficient to reach the level shown by the dotted line 62 indicated in FIG. 1 when the powder suspension device 18 is properly aerated; the powder suspension device 18 is a hollow container, either square or circular in cross-section, which is provided with a quantity of air at the bottom through a hose 64. The hose 64 connects with a space adjacent the bottom cover 66 of the powder suspension device 18. The bottom cover 66 connects with the main body of the powder suspension device 18 through a flanged connection 68. A porous plastic sheet 70 is inserted between the cover 66 and the powder suspension device 18 and around the flanged connection 68 in much the same manner as a gasket. A plurality of transverse rods 72 (only one of which is shown) are disposed across the cover member 66 to prevent the plastic sheet 70 from collapsing into the bottom of the cover 66. The plastic sheet 70 and the lower portion in the cover member 66 define a lower open area 74 with which the hose 64 communicates. Air is supplied through the hose 64 constantly at a pressure preferably about 2 psi to provide a powder suspension within the powder suspension device 18.

The main supply of air is from a compressor "C" (not shown per se) which is driven by a suitable engine or motor (not shown). This same motor (not shown) will power a generator (not shown) for supplying electrical power to an induction heating ring (now shown) which is used to heat the weld joint to the proper temperature before utilizing the apparatus of the present invention. The compressor "C" connects with a hose 76, which connects with a Tee 78 which, in turn, connects with a reducing valve 80 that supplies air to the hose 64 at the required pressure indicated above.

The compressor "C", referred to above, is capable of supplying air under pressure of, say, up to 90 psi. Thus, the air from the Tee 78 passes through another reducing valve 82 and into a hose 84 at a pressure of approximately 30 psi and to a solenoid valve 86 which is normally closed. The solenoid valve 86 is operated through an electrical conduit 88 which connects with the solenoid valve from an electrical control panel 90 which, in turn, connects with the supply from the generator (referred to above) through the plug 92.

At an appropriate time, as will be explained hereinafter, the solenoid valve 86 will be opened and air will pass through the solenoid valve from the hose 84 into a Tee 94. From the Tee 94 the air splits into two streams through hoses 96 and 98, respectively. Hose 96 connects with a valve 100 and hose 98 connects with a valve 102. The valves 100 and 102 are Venturi-type valves or eductors. Venturi 100 connects with a hose 104 and Venturi 102 connects with a hose 106. When air passes from the hose 96 through the Venturi 100 and into the hose 104, a suction is created at an opening in the Venturi to which the pipe 108 is connected. Pipe 108 connects with a valve 110 which, in turn, is connected to a pipe 112 that connects with the interior of the powder suspension device 18. The stream of air through the Venturi will pick up a quantity of powder from the powder suspension device 18.

The hose 104 connects with an outlet pipe 114 from a blower 116 which will be described hereinafter.

The Venturi 102 is connected in similar fashion to the Venturi 100, previously described; thus, the Venturi 102 connects with a pipe 118, a manually operated valve 120 and a pipe 122 which connects with the interior of the powder suspension device 18. The hose 106 which contains the powder suspension picked up by the Venturi 102 connects with a pipe 124 which is also connected to the blower 116.

The blower system 22 (see now also FIGS. 6 and 7) includes an upper member which has been described as the blower 116 itself and a lower cylindrical housing 130 which is in communication with the lower end of the blower 116 through the central opening 132. The blower 116 is provided with an impeller 134 (shown in dotted lines) which is driven by an electric motor 136 by the shaft (not shown) of the motor which connects with the hub of the impeller 134 in a conventional manner. Power to the electric motor is provided by the cord 138 which connects with the control box 90. The blower 116 has a tangential outlet 140 which connects with the two pipes 114 and 124 shown in FIG. 5 and which also connects through an auxiliary opening 141 with a porous filter bag 143, the purpose of which will later be described.

Air is sucked into the lower open end of the blower 116 through the opening 132 in the housing 130. The opening 132 connects with the upper end of a cylinder 142 which extends only partly down into the interior of the housing 130 (as best shown in FIG. 1). A pair of helically disposed baffle plates 144 and 146 are arranged within the interior of the housing 130 in the annular space between the housing 130 and the cylinder 142, the upper end of the baffle plate 146 being disposed above the lower end of the baffle plate 144 and vice versa. A pair of tangential inlet pipes 148 and 150 connect with the interior of the housing 130 approximately 180° apart and in the regions where the ends of the baffle plates 144 and 146 are disposed one above the other.

The pipe 114 from the blower 116 connects with a hose 160 which, as diagrammatically shown in FIG. 1, connects with the left-hand powder dispenser 16; similarly, the pipe 124 connects with a hose 162 which, as diagrammatically shown in FIG. 1, connects with the right-hand powder dispenser 16.

Figure 3:
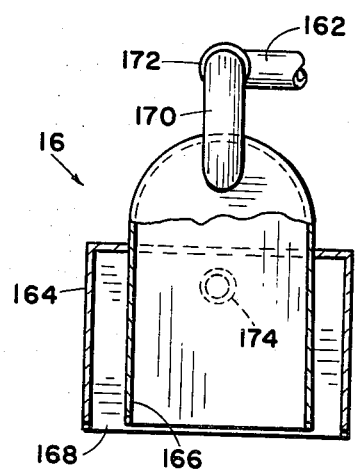
FIG. 3 is a side elevation of the powder dispensing device itself, with certain parts in cross-section.
Figure 4:
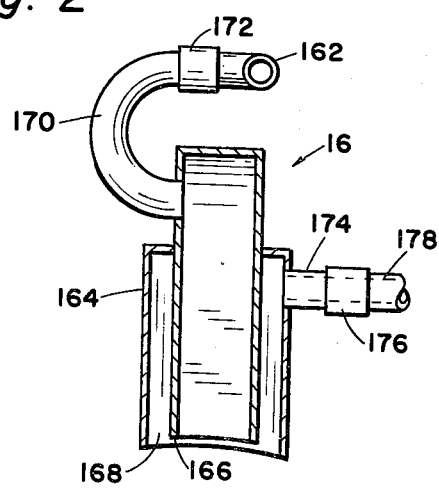
FIG. 4 is a view taken at right angles to FIG. 3, with certain parts in section.
Figure 5:
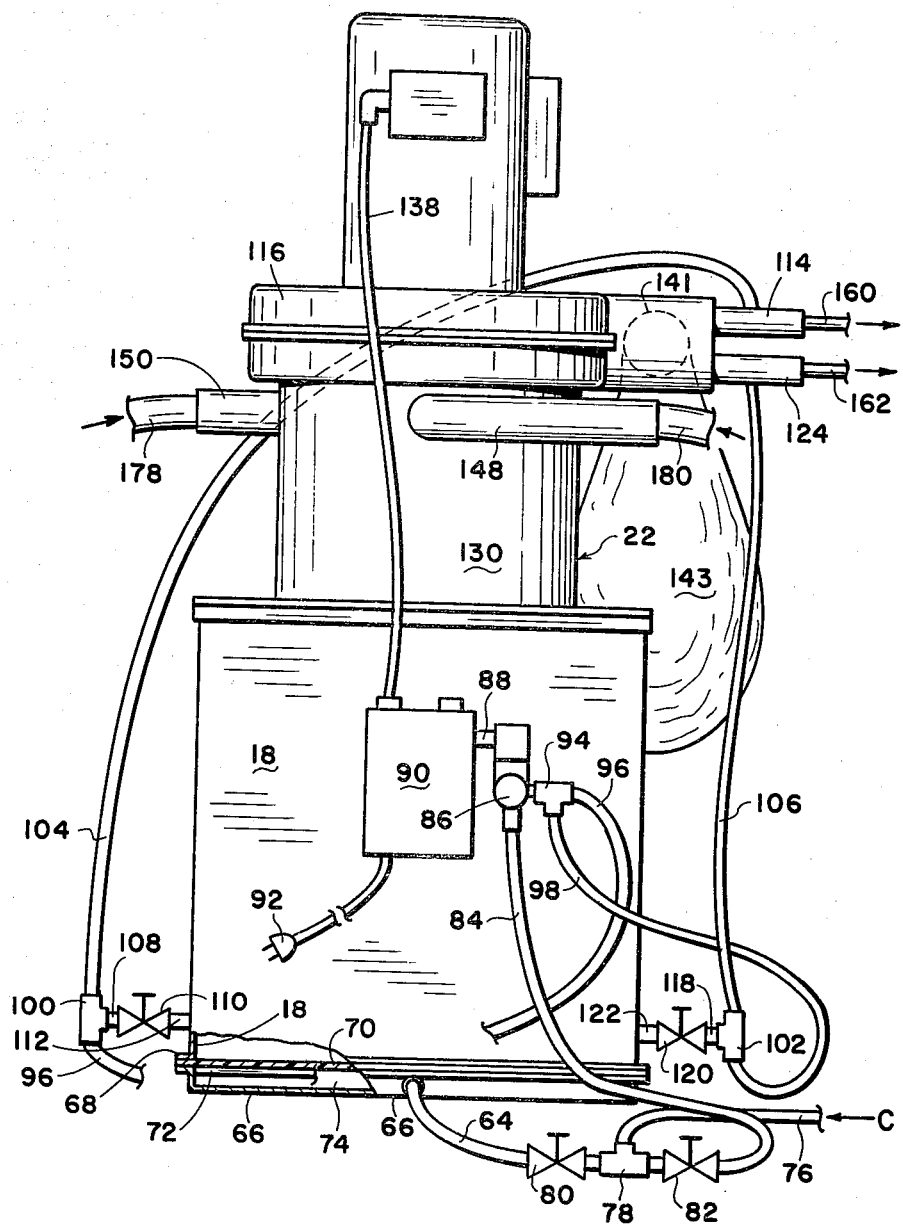
FIG. 5 is a side elevation, looking from the rear of FIG. 2, of the powder suspension and supply system employed in the present invention, with certain parts shown diagrammatically.
Figure 6:
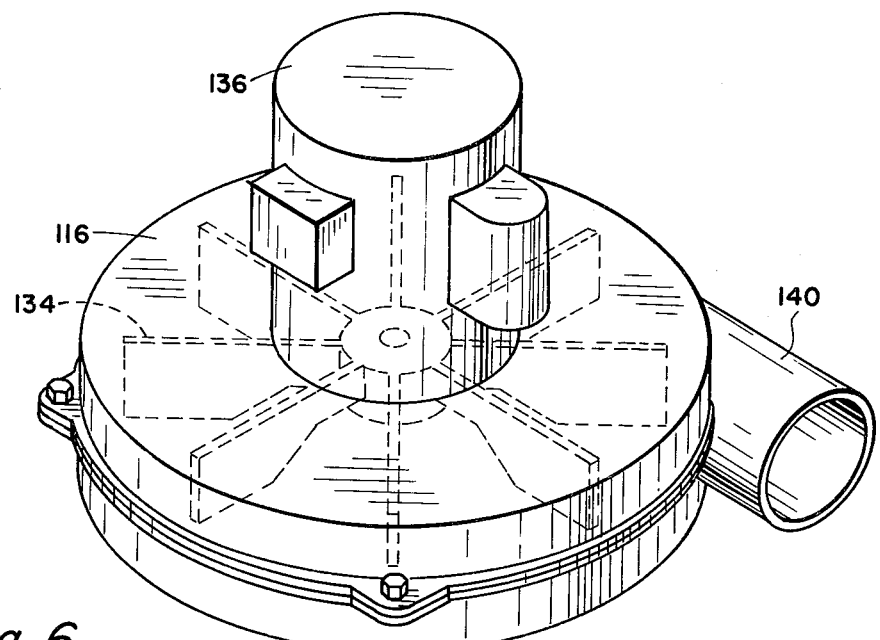
FIG. 6 is a perspective view, with certain hidden portions shown in dotted lines, of the blower apparatus shown in FIG. 5.

The powder dispenser 16 (more particularly, the right-hand powder dispenser 16 shown in FIG. 1) is shown in greater detail in FIGS. 3 and 4. This powder dispenser is substantially the same as the powder dispenser disclosed in prior U.S. Pat. No. 4,038,942 as illustrated in FIGS. 4 and 5 thereof. Each powder dispenser 16 includes an outer housing 164, open at the bottom, and an inner housing 166, also open at the bottom, and forming a peripheral space 168 with the outer housing 164. The upper end of the inner housing 166, which extends above the top of the outer housing 164 connects with a "C"-shaped inlet pipe 170 which, in turn, connects with a hose connector 172. The hose connector 172 connects with a hose 162 which, as previously described, connects with the outlet pipe 124 from the blower 116. The outer housing 164 connects with an outlet pipe 174 which, in turn, connects with a hose connector 176. The hose connector 176 connects with a hose 178 which connects back to the tangential inlet pipe 150 on the housing 130. The hose 178, therefore, constitutes the vacuum or suction return from the powder dispenser 16. As indicated in FIG. 4, the lower ends of the inner and outer housings are arcuately shaped to conform with the outer circumference of the pipe 10. The left-hand dispenser 16, shown in FIG. 1, is identical to the right-hand dispenser described above except, as indicated previously, the left-hand dispenser 16 connects with the pipe 114 by means of the hose 160; the suction return for the left-hand powder dispenser 16 is provided by a hose 180 which connects with the hose connector 176 (not shown) on the left-hand powder dispenser 16 and the tangential inlet pipe 148 on the housing 130.

In order for the vehicle 20 to move along the pipe 10, this vehicle is provided with a plurality of wheels 182 which are angularly attached to the vehicle as best shown in FIG. 1.

Operation

It will be assumed that the weld joint 12 has been previously heated by a suitable heating apparatus (not shown) to a temperature which will cause the powder to fuse or melt, and also to cure. With the vehicle 20 being positioned adjacent the heated weld joint 12, the yoke 14 is disposed over the weld joint 12 as shown in FIGS. 1 and 2. Air is continuously supplied at low pressure through the hose 64 to maintain the powder in suspension in the powder suspension device 18. Power can now be supplied to the motors 40 through an electrical control device (not shown) which connects with the electric generator referred to above. The motor 136 can now be actuated to turn on the blower 116. The solenoid valve 86 is also open in timed relation to the actuation of the motor 136. As the yoke 14 moves around the pipe 10 through the action of the belts 58, air passing through the Venturis 100 and 102 will pick up powder from the powder suspension device 18 and deliver a supply of powder to the pipes 114 and 124, respectively; this supply of powder will be suspended in the streams issuing from the hoses 160 and 162 which will then pass to the left-hand and right-hand powder dispensers 16, respectively. Powder will be sprayed upon the weld joint 12 through the inner housings 166 of the powder dispensers 16. Excess powder from the powder dispensing devices will be sucked up into the spaces 168 and will be returned by the hoses 178 and 180 to the tangential inlet pipes 150 and 148, respectively. Excess powder, which is returned to the interior of the housing 130 by means of the tangential inlet pipes 148 and 150 will be guided downwardly by the helical baffle plates 144 and 146 and will return to the powder suspension device 18 by means of the open communication between the bottom of the housing 130 and the top of the powder suspension device 18. Excess air from the blower 116 is discharged to the bag 143 to create an influx of air from the atmosphere to the outer chamber 164 of the dispensing head 16 thereby recovering any over-spray. Any particles of powder contained in the excess air issuing from the outlet 141 are trapped in the filter bag 143.

What is claimed is:

1. Apparatus for spraying a powder circumferentially around a pipe joint on a pipe comprising a yoke engagable with the pipe, means for driving the yoke circumferentially about the pipe, a pair of circumferentially spaced powder dispensers mounted on said yoke and disposed over the pipe joint, each powder dispenser having an inner housing, said inner housing having an opening positioned adjacent the surface of the pipe, each said powder dispenser having an outer housing surrounding said inner housing and having an opening positioned adjacent said pipe and surrounding the opening of said inner housing, said inner and outer housings being spaced from each other to form a space therebetween, a powder suspension device comprising a hollow container adapted to contain a quantity of powder therein, means for introducing air under pressure into said container to place the powder in suspension therein, a blower having an internal central inlet and a rotating impeller disposed therein, a tangential outlet connecting with the interior of said blower from which a stream of air is allowed to pass, a pair of outlet pipes extending outwardly from said tangential outlet, a cylindrical powder return housing mounted on said container beneath said blower and in communication with said central inlet to said blower, said return housing communicating with the upper end of said powder suspension device, a pair of tangential inlet pipes circumferentially spaced and connecting with the interior of said return housing, a pair of eductors having their suction ports connected to opposite sides of said container and in communication with said powder suspension therein, means for passing a stream of air through each eductor providing suction for withdrawing a quantity of powder suspension from said container, means for introducing said withdrawn powder suspension from said eductors into the sides of each outlet pipe, respectively, a supply conduit connecting each said outlet pipe with a respective inner housing of each powder dispenser for supplying a stream of air-powder suspension to each powder dispensing device, a return conduit connecting each tangential inlet of said return housing to the space between said inner and outer housing of each said powder dispenser for returning excess powder to said return housing, and means for rotating said impeller within said blower, thereby drawing air from said return housing to said blower through said central inlet, thus creating a suction within said return housing which subsequently causes withdrawal of excess powder from said pipe joint.

2. Apparatus as set forth in claim 1 wherein the open ends of said inner and outer housings are arcuately shaped to conform with the curvature of the pipe.

3. Apparatus as set forth in claim 1 wherein said tangential outlet from said blower is provided with an auxiliary outlet, and a porous filter bag connected to said auxiliary outlet.

4. Apparatus as set forth in claim 1 wherein said powder dispensers are mounted on said yoke approximately 180° apart.

5. Apparatus as set forth in claim 1 wherein said means for introducing air under pressure into said container comprises a hose connected to said container adjacent its bottom, and wherein said container includes a plurality of transverse rods mounted in said container at a location above said hose, and a horizontally disposed porous sheet supported by said rods.

6. Apparatus as set forth in claim 1 and being further characterized by said eductors being Venturis connected at their suction ports to valves which communicate with the interior of said powder suspension device.

7. Apparatus as set forth in claim 1 and including a pair of circumferentially spaced, helically disposed baffle plates within said return housing and being arranged in an annular space below said central inlet, and said tangential inlets being connected to said return housing in said annular space adjacent the ends of said baffle plates whereby the returning excess powder is directed downwardly toward said powder suspension device.

* * * * *